US005274899A

United States Patent [19]

Sentagnes et al.

[11] Patent Number: 5,274,899

[45] Date of Patent: Jan. 4, 1994

[54] METHOD FOR KNIFE SETTING IN A DISK-TYPE CUTTER AND KNIFE MOUNT

[75] Inventors: Dominique Sentagnes, Bordeaux; Rony Callens, Mérignac, both of France; Karl Schaefer, Lechbruck, Fed. Rep. of Germany

[73] Assignee: Dimetal S.A., Merignac, France

[21] Appl. No.: 16,825

[22] Filed: Feb. 12, 1993

[30] Foreign Application Priority Data

Feb. 12, 1992 [DE] Fed. Rep. of Germany ....... 4204077

[51] Int. Cl.$^5$ .......................... B23Q 3/00; B27C 1/00

[52] U.S. Cl. ........................................ 29/468; 29/464; 144/162 R; 144/176; 144/373

[58] Field of Search .................. 29/464, 468; 144/162

[56] References Cited

U.S. PATENT DOCUMENTS

| | | | |
|---|---|---|---|
| 2,712,904 | 7/1955 | Durkee | 144/176 |
| 4,085,494 | 4/1978 | Sybertz et al. | 29/468 |
| 4,480,667 | 11/1984 | Vaittinen et al. | 144/176 |
| 4,569,380 | 2/1986 | Arasmith | 144/176 |
| 5,129,437 | 7/1992 | Nettles et al. | 144/176 |

*Primary Examiner*—W. Donald Bray
*Attorney, Agent, or Firm*—Foley & Lardner

[57] ABSTRACT

A method and apparatus for setting the knife projection of regrindable, strip-shaped cutting tools which are each screwed releasably to a knife carrier (8) and which are releasably arranged together with the carrier, in an at least approximately radial direction, in the rotary-drivable disk (1) of a disk-type cutter. To simplify the operation and to improve the chip quality: first, each knife (4) of the disk (1) is set outside the disk-type cutter, in a single setting device, to a respective identical distance between the cutting edge (10) and the inner longitudinal edge (11) of the knife carrier (8) and is then screwed firmly to the associated knife carrier (8); second, after being installed in the disk (1), the knives (4) are successively oriented and fixed relative to a common plane (39) which is perpendicular to the disk axis (5) and which defines the first-cut face of the wood during the cutting (cutting plane); and third, the knife adjustment is carried out in such a way that the knife projection of each cutting edge (10) relative to the flight circle of the disk surface (3) increases outward in the radial direction over the knife length.

15 Claims, 6 Drawing Sheets

(X)

METHOD FOR KNIFE SETTING IN A DISK-TYPE CUTTER AND KNIFE MOUNT

BACKGROUND OF THE INVENTION

The invention relates to a method for setting the knife projection of regrindable, strip-shaped cutting tools which are each screwed releasably to a knife carrier and which are releasably arranged, together with the knife carrier, in an at least approximately radial direction, in the rotary-drivable disk of a disk-type cutter.

The invention relates, furthermore, to a knife mounting for a regrindable, strip-shaped cutting tool of a disk-type cutter having a drivable disk in which the knives are held releasably, in an at least approximately radial direction, in respective recesses, in such a way that the cutting edge projects above the disk surface with a defined knife projection, the knife being releasably screwed on its knife breast to a knife carrier and being loaded on its knife spine by a clamping jaw which bears with an oblique knife-supporting face against the knife spine and which is held releasably by an at least approximately axially directed clamping screw.

A method and apparatus for a knife mounting is disclosed in U.S. Pat. No. 4,685,497. A comb-type knife used as a disposable knife in a reversible version is shown. The knife projection is set by means of exchangeable knife-supporting battens which are held via spring-loaded pins and against which the knife bears with inner stop faces. To change the knife projection, the knife-supporting batten has to be exchanged for a batten of another width. The chip run-off face is formed by the knife carrier and is invariable in its position relative to the cutting edge.

U.S. Pat. No. 3,542,302 shows a comparable state of the art. The knife and knife holder are held purely non-positively. However, the knife and knife carrier are adjustable relative to one another. Both the knife and the knife carrier are each supported on their inner longitudinal edge via setting screws on a bearing face in the carrier of the disk of the disk-type cutter. These setting screws are adjustable independently of one another, so that, for example, only the knife or else only the knife carrier can be set. The setting screws are each screwed into the lower longitudinal edge of the knife or the knife carrier, respectively. After each service life, the setting screws of each knife have to be reset. For example, with a regrinding width of 40 mm and a regrind each time of 1 mm, a readjustment would have to be carried out 40 times. This is impossible with the setting screws, particularly in view of the thickness of the knives which normally amounts to 4 mm.

U.S. Pat. No. 2,712,842 discloses for a disk-type cutter a knife mounting having a knife carrier adjustable via setting screws. However, nothing is disclosed as to the setting or adjustment of the knife projection.

For a long-wood cutting machine, DE-A1-3,933,880 shows a comparable knife mounting, in which the knife/knife-carrier assembly is held only non-positively. This is a conventional knife system which consists of strip knives and of separate scoring blades in conjunction with knife carriers. In practice, however, the scoring blades break off and become more and more blunt, leading to serious problems. A possibility for setting the knife projection is not disclosed.

SUMMARY OF THE INVENTION

The object on which the present invention is based is to develop a knife-setting method and a knife mounting which allow simple operation and which lead to an improvement in the cutting quality.

In accordance with this object, the present invention provides a method for setting the projection of knives which are attached to knife carriers wherein the carriers are releasably arranged in an approximately radial direction in a rotary-drivable disk of a disk-type cutter, including the steps of setting each knife, before the knife is assembled in the disk-type cutter, using a single setting device, to a respective identical distance between a cutting edge of the knife and an inner longitudinal edge of a respective knife carrier; attaching each knife to the respective knife carrier; installing each knife carrier with the respective knife in the disk; successively orienting and fixing each knife relative to a common plane which is perpendicular to a disk axis and which defines a cutting plane; and adjusting each knife so that the projection of the cutting edge relative to a flight circle of the disk increases outward in the radial direction over the knife length.

The object of the present invention is further accomplished by providing, in a rotary drivable disk for a disk-type cutter, a knife mount for a knife having a knife breast, cutting edge, and knife spine, the knife mount including a holder defining a recess in the disk in an approximately radial direction, the recess including a resting face and a bearing face arranged at right angles to the resting face; a knife carrier to which the knife is releasably screwed on its knife breast; a clamping jaw which bears with an oblique knife-supporting face against the knife spine and which is held releaseably to the disk; an approximately axially directed clamping screw for holding the clamping jaw to the disk; a chip run-off batten which engages over the knife carrier and which bears behind the cutting edge against the knife breast and, on a side of the batten facing away from the knife, bears against the resting face, the chip run-off batten extending parallel to the knife and being vertically displaceable within the recess and including a groove of relatively large width; a first setting device for vertically displacing the chip run-off batten; and a second setting device for vertically displacing the knife in relation to the chip run-off batten.

Further features, details, and advantages of the invention will be apparent from the following description and accompanying drawings.

BRIEF DESCRIPTION OF THE DRAWINGS

The drawings are hereby expressly made a part of the specification.

DETAILED DESCRIPTION OF THE PREFERRED EMBODIMENTS

Figure 2:
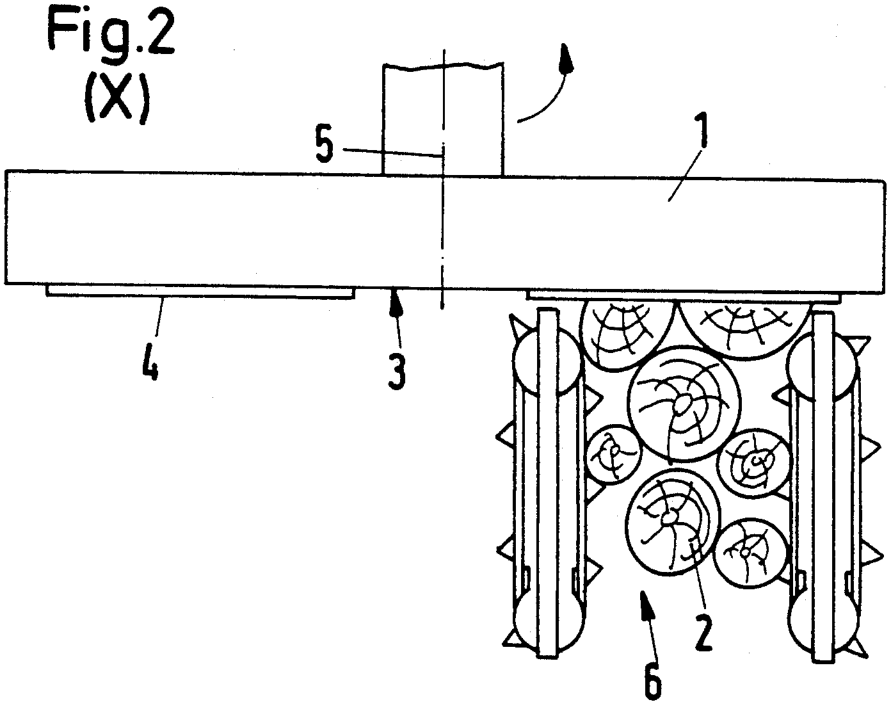
FIG. 2 shows a representation according to FIG. 1, as seen in the direction of the viewing arrow X in FIG. 1.

The present invention relates to a method for setting the knife projection of regrindable, strip-shaped cutting tools which are each screwed releasably to a knife carrier and which are releasably arranged, together with the knife carrier, in an at least approximately radial direction, in the rotary-drivable disk of a disk-type cutter, by means of the following features:

a) each knife of the disk is set, outside the disk-type cutter, in a single setting device to a respective identical distance between the cutting edge and the inner longitudinal edge of the knife carrier and is then screwed firmly to the associated knife carrier;

b) after being installed in the disk, the knives are successively oriented and fixed relative to a common plane which is perpendicular to the disk axis and which defines the first-cut face of the wood during the cutting (cutting plane).

c) the knife adjustment is carried out in such a way that the knife projection of each cutting edge relative to the flight circle of the disk surface increases outward in the radial direction over the knife length.

This invention is based on the following recognition:

The knife projection has hitherto generally been set in relation to the disk surface, ignoring the fact that, as a result of material stresses, the disk is usually slightly wavy, that is to say it "wobbles"or "wavers"when it rotates. This wobbling phenomenon increases with an increasing disk diameter and frequently becomes even worse in practice because metallic foreign bodies or hard stones enclosed in the wood interfere with the cutting. The disk surface thereby briefly assumes very high temperatures, this leading, in turn, to material stresses or to deformations resulting from material stresses. The setting of the knife projection relative to the disk surface consequently leads to an inaccurate knife setting and therefore to chips of unequal or undesirable thickness.

According to the present invention, there is selected for setting the knife projection a plane which is located outside the machine and which can be defined as a cutting plane and is exactly perpendicular to the axis of rotation of the disk. Disk deformations, and especially also wear phenomena in the disk surface, therefore, no longer affect the knife adjustment.

In disk-type cutters, the varying cutting speed over the length of each knife has an adverse effect on the chip production. In the largest disk-type cutters used at the present time, the cutting speed at the radially inner end of each knife is approximately 20 m/s, while at the radially outer knife end it is approximately 60 m/s. This results in an increase in the surface roughness of the chips, as seen in the radial direction outward. While, in knife-shaft cutters having identical cutting speeds in all portions of the shaft, it is sufficient to bring all the knives to the same respective projection above the shaft surface, in disk-type cutters this leads to an inadequate chip quality. To afford an improvement here, however, the following phenomenon also has to be taken into account:

With an increasing cutting speed, the elastic deformation of the wood located in the cutting region increases. Since the wood still to be cut requires a somewhat longer time to spring back, according to the present invention the knife projection is set so that it increases outward, as seen in the radial direction, over the knife length. The amount of this increase depends on the rotational speed of the disk and on the disk diameter or the knife length.

So that an identical setting of all the knives can be carried out here, according to the present invention the knife adjustment preferably takes place in such a way that the mean reference circle of all the knives is set to the cutting plane.

The invention relates, furthermore, to a knife mounting for a regrindable, strip-shaped cutting tool of a disk-type cutter having a drivable disk in which the knives are held releasably, in an at least approximately radial direction, in respective recesses, in such a way that the cutting edge projects above the disk surface with a defined knife projection, the knife being releasably screwed on its knife breast to a knife carrier and being loaded on its knife spine by a clamping jaw which bears with an oblique knife-supporting face against the knife spine and which is held releasably by an at least approximately axially directed clamping screw, a chip run-off batten which engages over the knife carrier and which bears with a contact face behind the cutting edge against the knife breast and, on its side facing away from the knife, against a resting face limiting said recess and extending parallel to the knife, the chip run-off batten being vertically displaceable within the recess via a first setting device, and, furthermore, by means of a second setting device, loading the knife carrier and/or the knife, for the relative displacement of the knife in relation to the chip run-off batten.

The knife mounting according to the invention thus affords the possibility of setting an individually different knife projection increasing radially outward over the knife length. The distance of the chip run-off face from the knife cutting edge can, moreover, also be varied. This adjustment possibility is based on the following considerations:

In Europe, chip boards for the furniture industry, of which the chip thicknesses in the covering layer are between 0.15 and 0.25 mm and in the middle layer between 0.35 and 0.55 mm, are primarily produced. In contrast, in the USA and Canada, chip boards made of directed chips ("oriented structural board"=OSB) for building purposes and the like or chip boards made of large-surface chips (wafer board) in chip thicknesses of 0.6–0.7 mm are predominantly produced.

The basically undesirable surface roughness of the chips and respective chip forms can be influenced by appropriate measures, of course within limits which are governed especially by the types of wood, the state of the wood, wood moisture, knife sharpness and chip thickness. The distances at which the peeled-off chip strips break longitudinally relative to the fiber can be influenced by, inter alia, varying the acute angle which the chip run-off face forms with its contact face, but for reasons of wear this angle should not fall below a specified value. To influence the chip length (as seen transversely to the fiber), so-called chip breakers ("reactor knives") arranged opposite the chip run-off batten in the chip passage are used. However, their effect is unsatisfactory, not least because they considerably increase the energy consumption of the disk-type cutter. Thin chips, as a result of their high elasticity, break less often longitudinally relative to the fiber and their surface roughness is lower if the chip deflection takes place as close as possible behind the knife cutting edge. With an increasing chip thickness, the chip rigidity increases. They therefore tend rather to break longitudinally relative to the fiber at uncontrolled or undesirable distances. This is desirable when long narrow chips, so-called "strands", for OSB are to be produced. For the production of wafers, therefore, the distance between the cutting edge of the knife and the top edge of the chip run-off batten should be increased considerably, for example from approximately 2 to approximately 6–8 mm. varying the distance between the cutting edge and the top edge of the chip run-off face is provided, in order to improve the chip quality substantially.

Each setting device can have at least two setscrews which are spaced over the length of the chip run-off batten and which form adjustable stops. The setscrews loading the chip run-off batten afford the possibility of compensating the wear which occurs in the wood supports after some months of operating time. The free projection of the knife-breast face, nevertheless, remains the same, since the top edge of the chip run-off face of the chip run-off batten has in the meantime also become worn. A chip run-off batten engaging over the knife breast plate in a knife mounting for the knife head of a wood-cutting machine is known (DE-C1-3,437,688). This previously known chip run-off batten has wood supports which, for receiving integrated scoring blades, are grooved according to the contour of the integrated scoring blades in the region of the cutting edge of the full-thickness cutting knife. However, this previously known knife mounting serves to solve other problems which are specific to knife shafts and which cannot be transferred to disk-type cutters.

Figure 1:
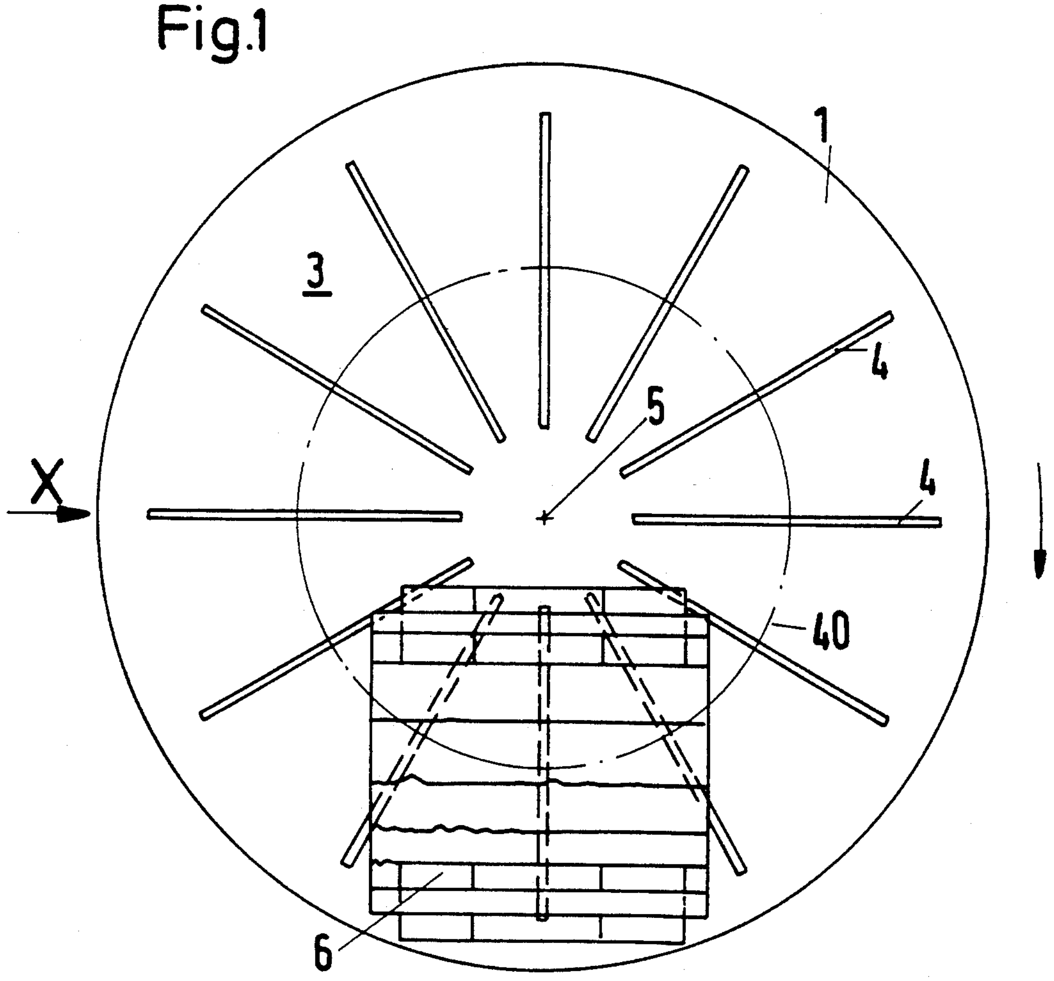
FIG. 1 shows, in a diagrammatic representation, a top view of the disk of a disk-type cutter having a wood feed shaft.

FIGS. 1 and 2 show diagrammatically the disk 1 of a disk-type cutter, not shown in more detail, for the processing of short wood 2. The disk 1, of which the surface facing the short wood 2 is designated by the reference symbol 3, is equipped in this surface 3 with respectively radially arranged knives 4. Arranged parallel to the disk axis 5 is a wood feed shaft 6, the shaft walls of which are formed by endlessly rotating chains or the like which convey the short wood 2 in the way indicated in FIG. 2 up against the surface 3 of the disk 1 and thus into the effective range of the rotating knives 4. The short wood 2 lies with its fiber parallel to the cutting edges of the knives 4.

Figure 3:
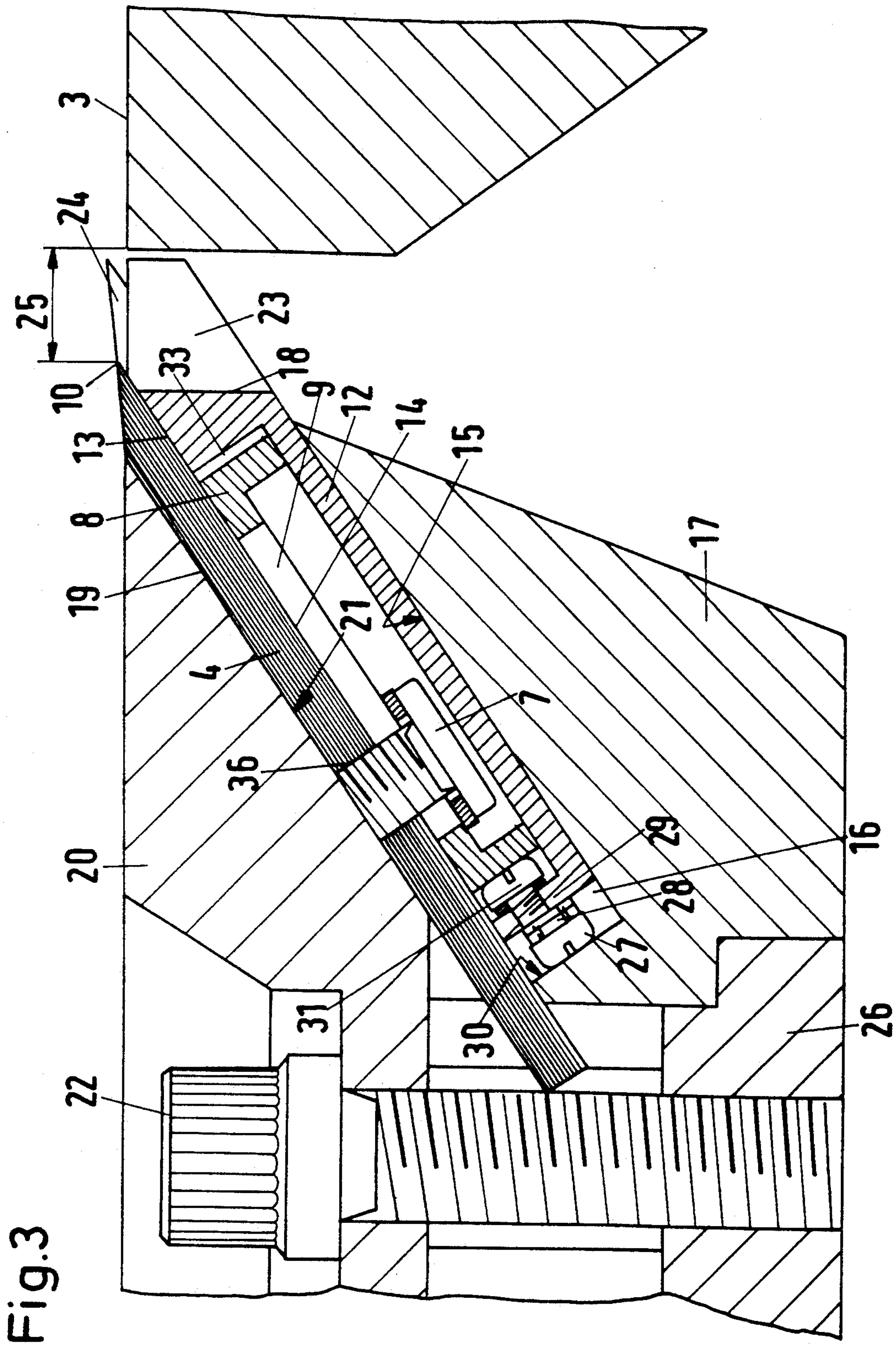
FIG. 3 shows, on an enlarged scale and in cutout form, a cross-section through a knife mounting along the line III—III in FIG. 5.

Provided for each of the knives 4 indicated diagrammatically in FIG. 1 is a knife mounting, of which FIG. 3 shows a first exemplary embodiment. According to this, each knife 4 is screwed releasably to a knife carrier 8 via at least one connecting screw 7. The connecting screw 7 is guided in a transverse slot 9 in the knife carrier 8, so that, after the release of the connecting screw 7, a relative displacement between the knife 4 and the knife carrier 8 can be carried out, in particular in order to set the distance of the knife cutting edge 10 from the inner longitudinal edge 11 of the knife carrier 8. A chip run-off batten 12 engages over the knife carrier 8 and bears with a contact face 13 behind the cutting edge 10 against the knife breast 14 and, with its side facing away from the knife 4, against a resting face 15 which limits a recess 16 which receives the actual knife mounting and is located in a holder 17 and which extends parallel to the knife 4. The upper longitudinal edge of the chip run-off batten 12 forms a chip run-off face 18 which is at a distance a from the cutting edge 10 (See FIG. 4).

The knife 4 is loaded on its knife spine 19 by a clamping jaw 20 which bears with an oblique knife-supporting face 21 against the knife spine 19 and which is held releasably by an at least approximately axially directed clamping screw 22. The clamping screws 22 are screwed into threaded parts 26 of the disk 1. When this clamping screw 22 is being tightened, the clamping jaw 20 presses the knife 4 together with its knife carrier 8 and the chip run-off batten 12 engaging over the latter into said recess 16, in which the chip run-off batten 12 need be held only non-positively.

In the exemplary embodiment illustrated, a one-cut-knife (i.e., a full-length cutting knife as distinguished from a serrated knife or comb knife) is used as a knife 4. Fastened releasably at a clear radial distance from one another to the chip run-off face 18 of the chip run-off batten 12 are wood supports 23 which have integrated scoring blades 24 projecting above the disk surface 3 and which project into a chip passage slot 25.

Figure 8:
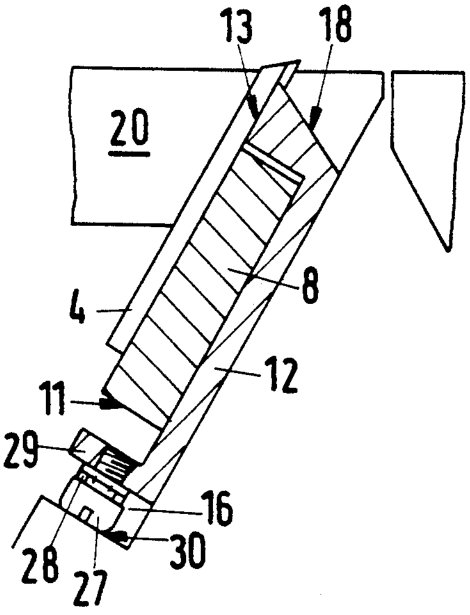
FIG. 8 shows a section along the line VIII—VIII in FIG. 6.

For displacing the chip run-off batten 12 within the recess 16 in order to vary the distance from the disk surface 3, there is a first setting device (see also FIG. 8) which has setscrews 27 and exchangeable shims 28. Screwed into each of the two end regions of the inner longitudinal edge 29 of the chip run-off batten 12 is a setscrew 27 which is supported with its head on a bearing face 30 arranged at right angles to said resting face 15 and belonging to the recess 16. As a result of the rotation of the setscrews 27, the height of the chip run-off batten 12 relative to the disk surface 3 can be varied, and the desired position can be obtained by retaining the setscrews 27, for example by means of a lock nut, or else, as shown in the drawings, by slipping on appropriate shims 28 of differing thickness.

For the relative displacement of the knife 4 in relation to the chip run-off batten 12, there is a second setting device which once again has setscrews 31 and shims 32. In the opposite direction to the two above-mentioned setscrews 27 of the first setting device, a setscrew 31 is screwed into each of the two end regions of the inner longitudinal edge 29 of the chip run-off batten 12 from a groove 33 receiving the knife carrier 8 and belonging to the chip run-off batten 12 and forms with its head an inner stop for the inner longitudinal edge 11 of the knife carrier 8. As a result of the rotation of the setscrews 31, therefore, the height of the knife carrier 8 within the chip run-off batten 12 can be varied and thus the knife 4 relatively displaced in relation to the chip run-off batten 12 The desired position can be obtained by retaining the setscrews 31, for example be means of a lock nut, or else, as shown in the drawings, by slipping on appropriate shims 32 of differing thickness.

Figure 4:
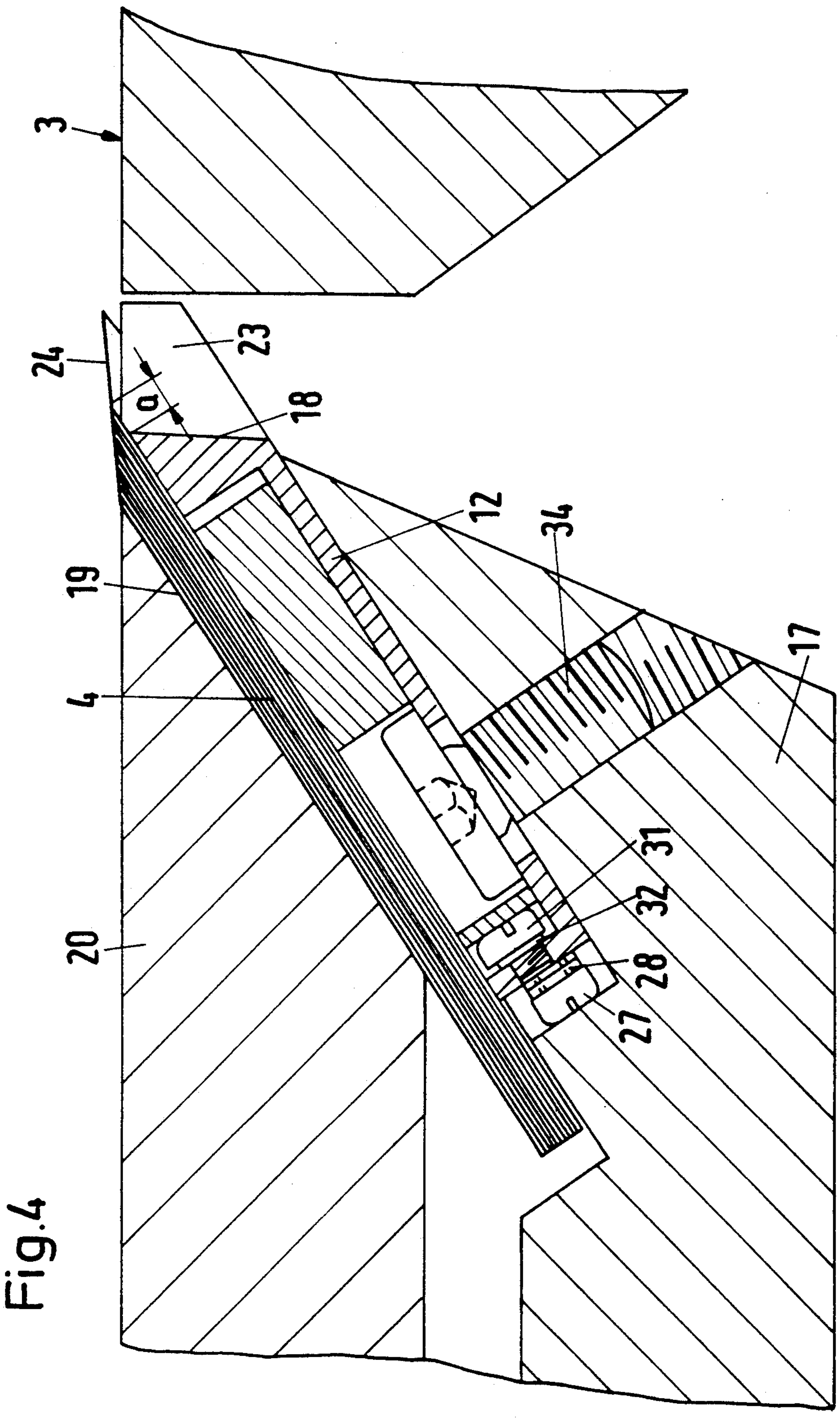
FIG. 4 shows, in a representation according to that of FIG. 3, a section through a knife mounting along the line IV—IV in FIG. 5.
Figure 5:
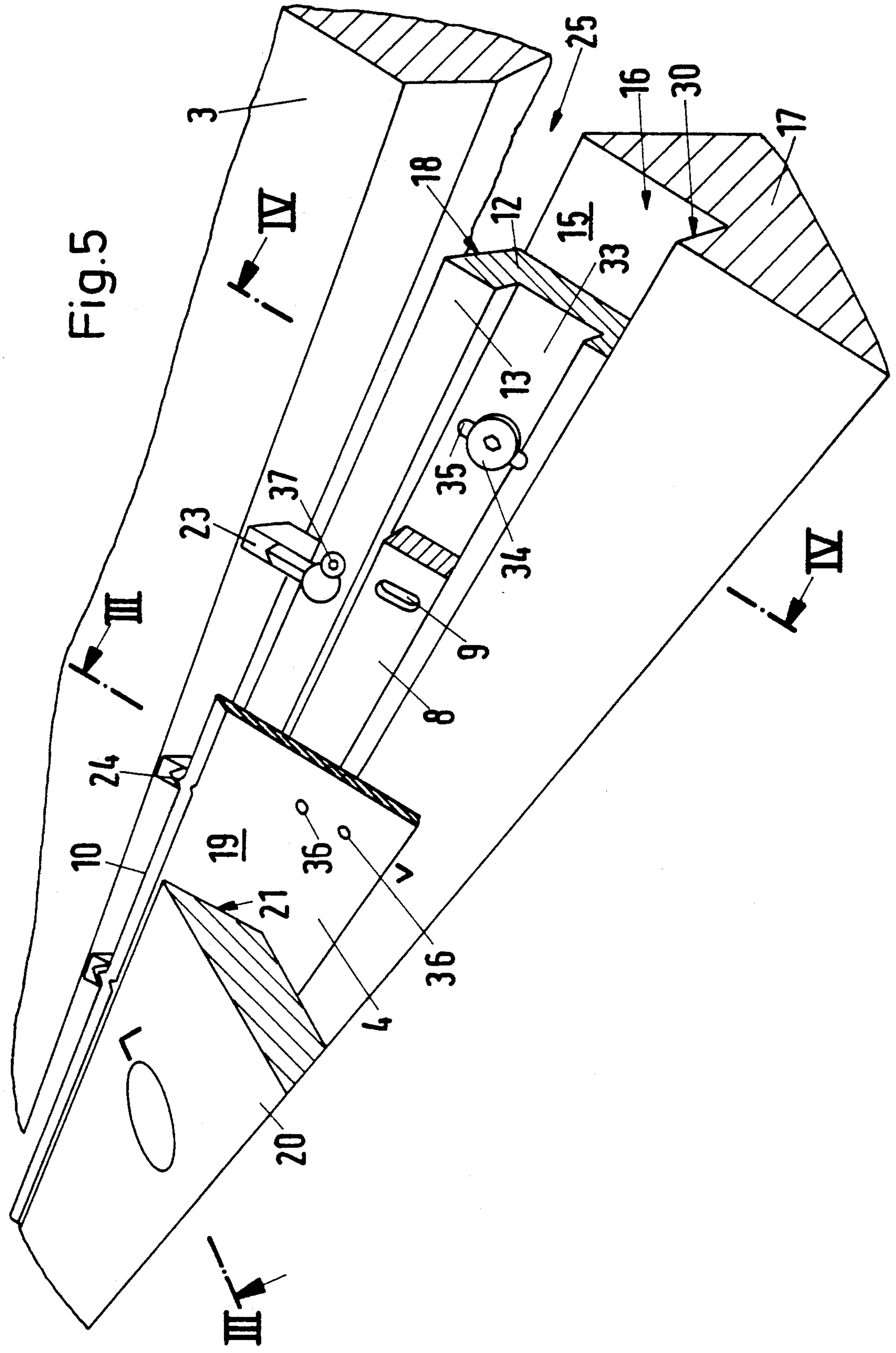
FIG. 5 shows a perspective representation of parts of a knife mounting.
Figure 6:
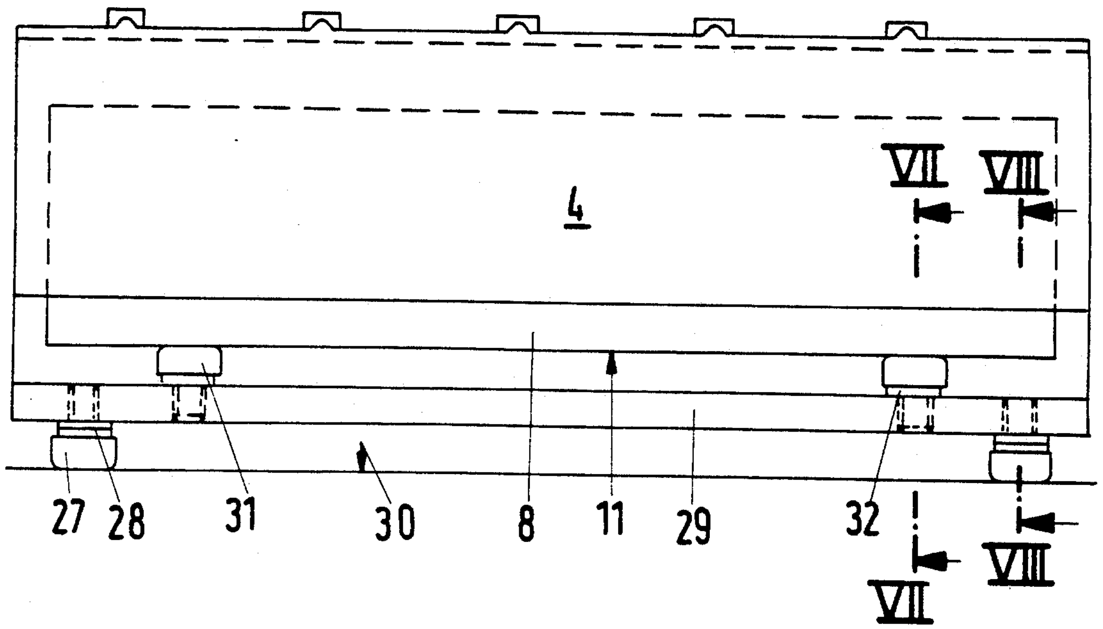
FIG. 6 shows a top view of a knife mounting.
Figure 7:
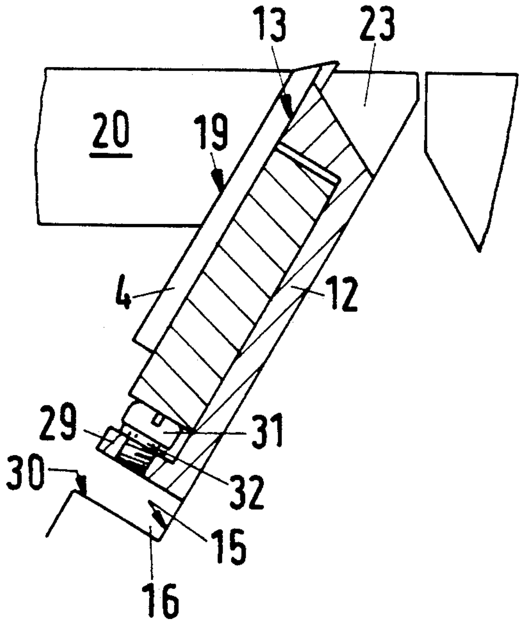
FIG. 7 shows a section along the line VII—VII in FIG. 6.

The embodiment according to FIG. 4 differs from that of FIG. 3 only in that the chip run-off batten 12 is releasably connected positively to the resting face 15 via fastening screws 34. FIG. 5 shows that these fastening screws 34 are each inserted through a long hole 35 in the chip run-off batten 12, so that, after the fastening screws 34 have been released, the height adjustment of the chip run-off batten 12 can be carried out by means of the first setting device.

The screw connection between the knife 4 and knife carrier 8 is not shown in FIG. 4 for the sake of greater clarity.

FIG. 5 illustrates, in the knife 4, a threaded hole 36 for receiving a connecting screw 7. Also indicated is a fastening screw 37 for fixing a wood support 23 to the chip run-off batten 12.

Figure 9:
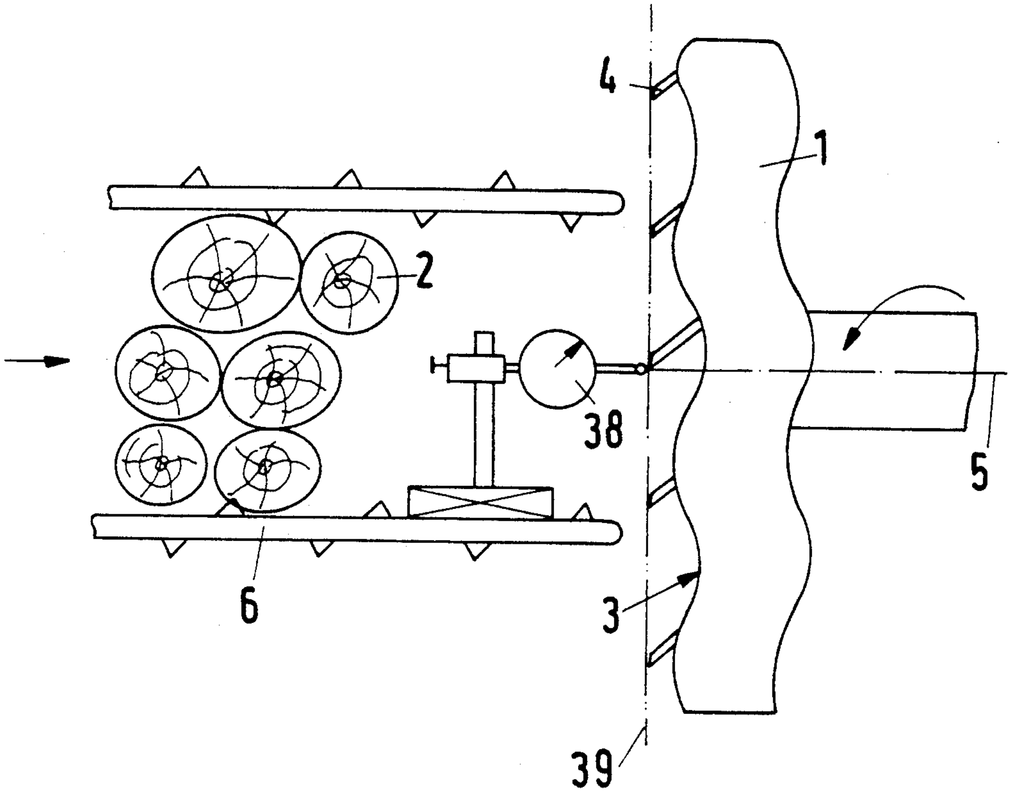
FIG. 9 shows a diagrammatic representation of a measuring device for setting the knives.

FIG. 9 shows a measuring device for setting the knife projections. In this, the disk 1 is shown roughly distorted, in order to illustrate a usually unavoidable wavering of the disk and an uneven wear in the disk surface 3. At least one meter 38 is attached to the shaft wall, parallel to the disk axis 5, of the wood feed shaft 6, for example magnetically, over a large bearing face. The dot-and-dash line indicates the plane 39, in relation to which the knives 4 are successively set. This plane, which is perpendicular to the disk axis 5, is not obtained by reference to the disk surface 3. On the contrary, it is with reference to the first-cut face of the wood which occurs during the cutting and which is designated below as a cutting plane.

The setting of the knife projection, which is to be carried out only once in dependence on the type of chip desired, is executed as follows (of course, further correction has to be made after an overheating of the disk, longer wear or the like):

Each knife 4 of the disk is set to the same projection outside the disk-type cutter, in a single setting device not shown in more detail in the drawing, by setting a respective identical distance between the cutting edge 10 and the inner longitudinal edge 11 of the knife carrier 8. By tightening the connecting screw 7, the knife 4 and knife carrier 8 are then firmly connected in the previously set relative position in relation to one another.

With the clamping screws 22 released and the clamping jaw 20 swung away, the chip run-off batten 12 is inserted into the recess 16 of the holder 17, after all the setscrews 27, if appropriate equipped with shims 28, have been tightened firmly. The chip run-off batten 12 is brought with the heads of its setscrews 27 to bear against the bearing face 30 of the recess 16. The knife 4/knife-carrier 8 assembly is then inserted in such a way that the knife carrier 8 penetrates into the groove 33 of the chip run-off batten 12 and the knife 4 bears with its knife breast 14 against the contact face 13 of the chip run-off batten 12. The knife carrier 8 is brought to bear with its inner longitudinal edge 11 against the previously firmly tightened setscrews 31 equipped, if appropriate, with shims 32. The clamping jaw 20 is then subsequently pivoted over the knife 4, until the knife-supporting face 21 is located above the knife spine 19. By slightly tightening the clamping screws 22, the knife 4/knife carrier 8 and the chip run-off batten 12 are fixed with a clamping effect in the predetermined position.

The knives 4 are then oriented with the above-explained cutting plane 39 as follows. For this, the meter 38 is attached magnetically with a large bearing face to the wall of the wood feed shaft 6 lying parallel to the disk axis 5 and is set with its tracer to the plane 39. The disk 1 is then rotated by hand, and for each knife it is measured whether its cutting edge 10 is plus or minus in relation to the plane 39. As a result of the rotation of the setscrews 31 and/or the exchange of the shims 32 for a thinner or a thicker shim, the projection of each knife 4 is then set individually in such a way that, finally, the mean reference circle 40 of all the knives 4, which is represented by dot-and-dash lines in FIG. 1, lies in the plane 39.

As a result of the setting of the setscrews 27 and/or exchange of the shims 28 for shims of greater or lesser thickness, the chip run-off battens 12 and consequently the knife carriers 8 arranged in them, together with the knives 4, are set in such a way that the knife projection of each cutting edge 10 relative to the flight circle of the disk surface 3 increases outward in the radial direction over the knife length.

In conclusion, all the clamping screws 22 are then tightened firmly, with the result that the knives 4 are fixed immovably in the set position.

The knife projection above the disk surface 3 can thus be varied both via the setscrews 27 and via the setscrews 31. In the former instance, the chip run-off batten 12 and therefore also the knife carrier 8 supported on it and, together with the knife carrier 8, the knife 4 are displaced; however, in this case, the distance a between the cutting edge 10 and the chip run-off face 18 remains unchanged. To vary the distance a, a relative displacement between the knife 4 and the chip run-off batten 12 is necessary; this is achieved by setting the setscrews 31, with the result that the knife carrier 8 is displaced vertically relative to the chip run-off batten 12 within the groove 33 of the latter.

If the chip run-off battens 12 are held not only non-positively, but, according to the embodiment illustrated in FIG. 4, also positively via fastening screws 34, then a height adjustment of the chip run-off battens 12 necessitates the previous release of these fastening screws 34 which are tightened again firmly after the adjustment has been made.

Many changes and modifications in the above-described embodiments of the invention can of course be carried out without departing from the scope thereof. Accordingly, the scope of the invention is limited only by the scope of the appended claims and equivalents thereof.

What is claimed is:

1. A method for setting the projection of knives which are attached to knife carriers wherein the carriers are releasably arranged in an approximately radial direction in a rotary-drivable disk of a disk-type cutter, comprising the steps of:

a) setting each knife, before the knife is assembled in the disk-type cutter, using a single setting device, to a respective identical distance between a cutting edge of the knife and an inner longitudinal edge of a respective knife carrier;
b) attaching each knife to the respective knife carrier;
c) installing each knife carrier with the respective knife in the disk;
d) successively orienting and fixing each knife relative to a common plane which is perpendicular to a disk axis and which defines a cutting plane; and
e) adjusting each knife so that the projection of the cutting edge relative to a flight circle of the disk increases outward in the radial direction over the knife length.

2. The method as claimed in claim 1, wherein the step of orienting and fixing includes orienting and fixing each knife such that a mean reference circle of all the knives is set to the cutting plane.

3. The method as claimed in claim 1, wherein the knives include one-cut or full-length cutting knives.

4. The method as claimed in claim 3, wherein the cutting knives are equipped with integrated scoring blades.

5. In a rotary drivable disk for a disk-type cutter, a knife mount for a knife having a knife breast, cutting edge, and knife spine, the knife mount comprising:

a holder defining a recess in the disk in an approximately radial direction, the recess including a resting face and a bearing face arranged at right angles to the resting face;

a knife carrier to which the knife is releasably screwed on its knife breast;

a clamping jaw which bears with an oblique knife-supporting face against the knife spine and which is held releaseably to the disk;

an approximately axially directed clamping screw for holding the clamping jaw to the disk;

a chip run-off batten which engages over the knife carrier and which bears behind the cutting edge against the knife breast and, on a side of the batten facing away from the knife, bears against the resting face, the chip run-off batten extending parallel to the knife and being vertically displaceable within the recess and including a groove of relatively large width;

a first setting device for vertically displacing the chip run-off batten; and a second setting device for vertically displacing the knife in relation to the chip run-off batten.

6. The knife mount of claim 5, wherein the chip run-off batten is releasably connected positively to the resting face.

7. The knife mount as claimed in claim 6, wherein the positive connection is a screw connection.

8. The knife mount as claimed in claim 5, wherein the chip run-off batten is supported on its inner longitudinal edge by the first setting device on a bearing face of the holder arranged at right angles to the resting face.

9. The knife mount as claimed in claim 5, wherein the knife carrier is supported on the chip run-off batten by the second setting device.

10. The knife mount as claimed in claim 5, wherein each setting device has exchangeable shims of differing thickness.

11. The knife mount as claimed in claim 5, wherein each setting device has at least two setscrews which are spaced over the length of the chip run-off batten and which form adjustable stops.

12. The knife mount as claimed in claim 11, wherein the shims are slipped onto the setscrews.

13. The knife mount as claimed in claim 11, wherein the knife carrier has an approximately rectangular profile and lies in the groove of the chip run-off batten and rests with its inner longitudinal edge on setscrews which are screwed into the inner longitudinal edge of the chip run-off batten.

14. The knife mount as claimed in claim 5, further comprising wood supports fastened releasably to the chip run-off batten and projecting at a clear radial distance from one another into a chip passage slot.

15. The knife mount as claimed in claim 14, wherein the wood supports comprise integrated scoring blades projecting above the disk surface.

* * * * *